United States Patent [19]

Gurski

[11] Patent Number: 4,953,172
[45] Date of Patent: Aug. 28, 1990

[54] GAS LASER

[75] Inventor: Thomas R. Gurski, 62 Martin Rd., Concord, Mass. 01742

[73] Assignee: Thomas R. Gurski, Concord, Mass.

[21] Appl. No.: 944,987

[22] Filed: Dec. 22, 1986

[51] Int. Cl.⁵ .......................... H01S 3/22; H01S 3/03; H01S 3/045

[52] U.S. Cl. ........................ 372/62; 372/34; 372/35; 372/58; 330/43

[58] Field of Search .................. 372/62, 61, 58, 59, 372/34, 35

[56] References Cited

U.S. PATENT DOCUMENTS

| | | | |
|---|---|---|---|
| 3,501,714 | 3/1970 | Myers et al. | 331/94.5 |
| 3,651,367 | 3/1972 | Yamamoto et al. | 313/204 |
| 3,670,262 | 6/1972 | Hallock et al. | 331/94.5 |
| 3,750,047 | 7/1978 | Gilson | 331/94.5 |
| 3,763,442 | 10/1978 | McMahan | 331/94.5 |
| 3,772,611 | 11/1973 | Smith | 331/94.5 |
| 3,898,586 | 8/1975 | Nelson et al, | 372/53 |
| 4,103,255 | 7/1978 | Schlossberg | 331/94.5 |
| 4,143,339 | 3/1979 | Buzzard et al. | 331/94.5 |
| 4,169,251 | 9/1979 | Laakman | 331/94.5 |
| 4,228,406 | 10/1980 | Lewis et al. | 372/35 |
| 4,380,077 | 4/1983 | McMahan | 372/62 |
| 4,553,241 | 11/1985 | Chaffee | 372/62 |
| 4,625,317 | 11/1986 | Kolb et al. | 372/88 |
| 4,683,575 | 7/1987 | Carlson et al. | 372/58 |
| 4,694,463 | 9/1987 | Hirth et al. | 372/34 |
| 4,696,011 | 9/1987 | Kearsley | 372/61 |
| 4,723,254 | 2/1988 | Turner | 372/59 |
| 4,752,936 | 6/1988 | Gerhardt | 372/62 |
| 4,759,027 | 7/1988 | Hahn et al. | 372/61 |
| 4,764,932 | 8/1988 | Peterson et al. | 372/62 |

FOREIGN PATENT DOCUMENTS 2071904 3/1981 United Kingdom .

Primary Examiner—Nelson Moskowitz

[57] ABSTRACT

A gas laser with a discharge bore defined by a single-bore extruded ceramic discharge tube is disclosed. An outer tube is located over the discharge tube so as to define an annular space therebetween. Caps are located over both ends of the tubes and each cap is provide with at least one gas transport passage so the discharge bore and the annular space are in communication. The annular space is filled with electrically insulating, thermally conducting components such as washers, baffles and ceramic granules. When the laser is in operation the annular space serves as a gas return path so a uniform equilibrium pressure is maintained in the discharge bore. The components in the annular space inhibit the flow of electrical current in the space so all of the current flow is through the discharge bore so as to excite the gas therein. The components in the annular space also provide a thermally conductive path between the discharge tube and the outer tube to diffuse heat away from the discharge bore.

29 Claims, 2 Drawing Sheets

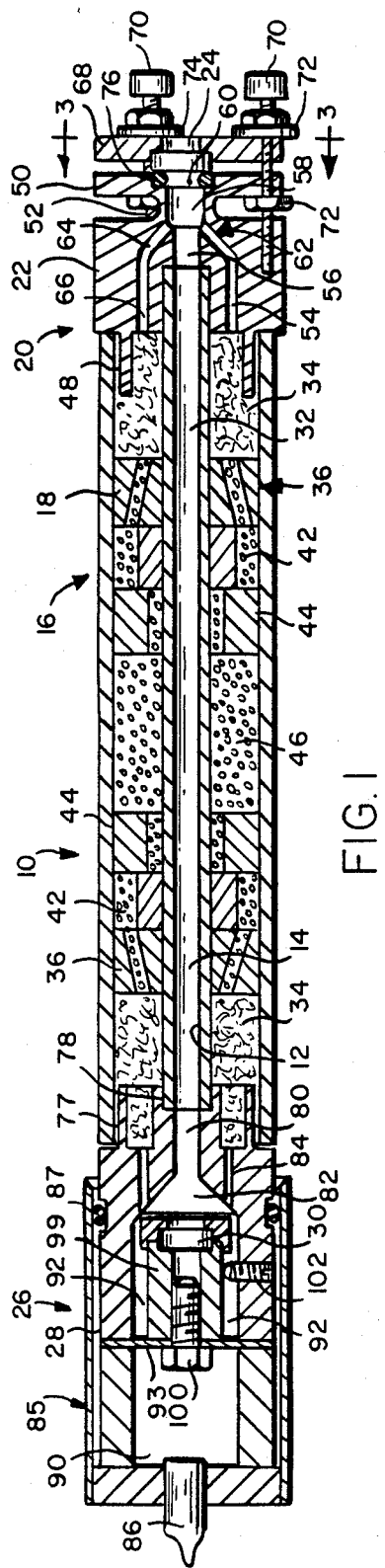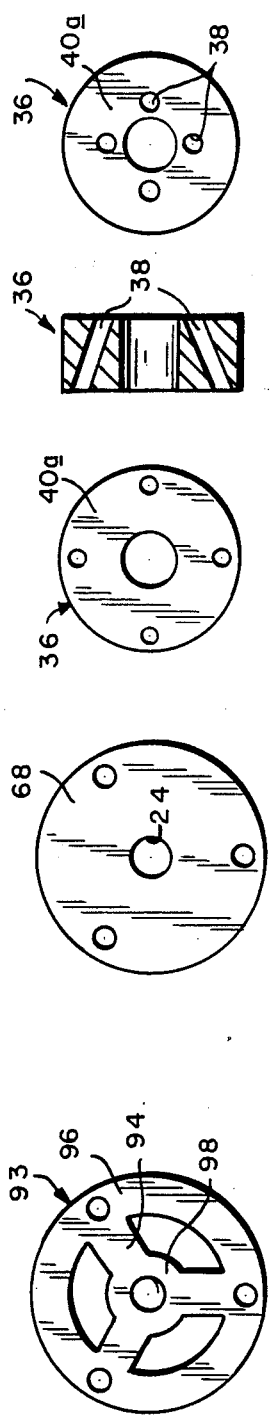

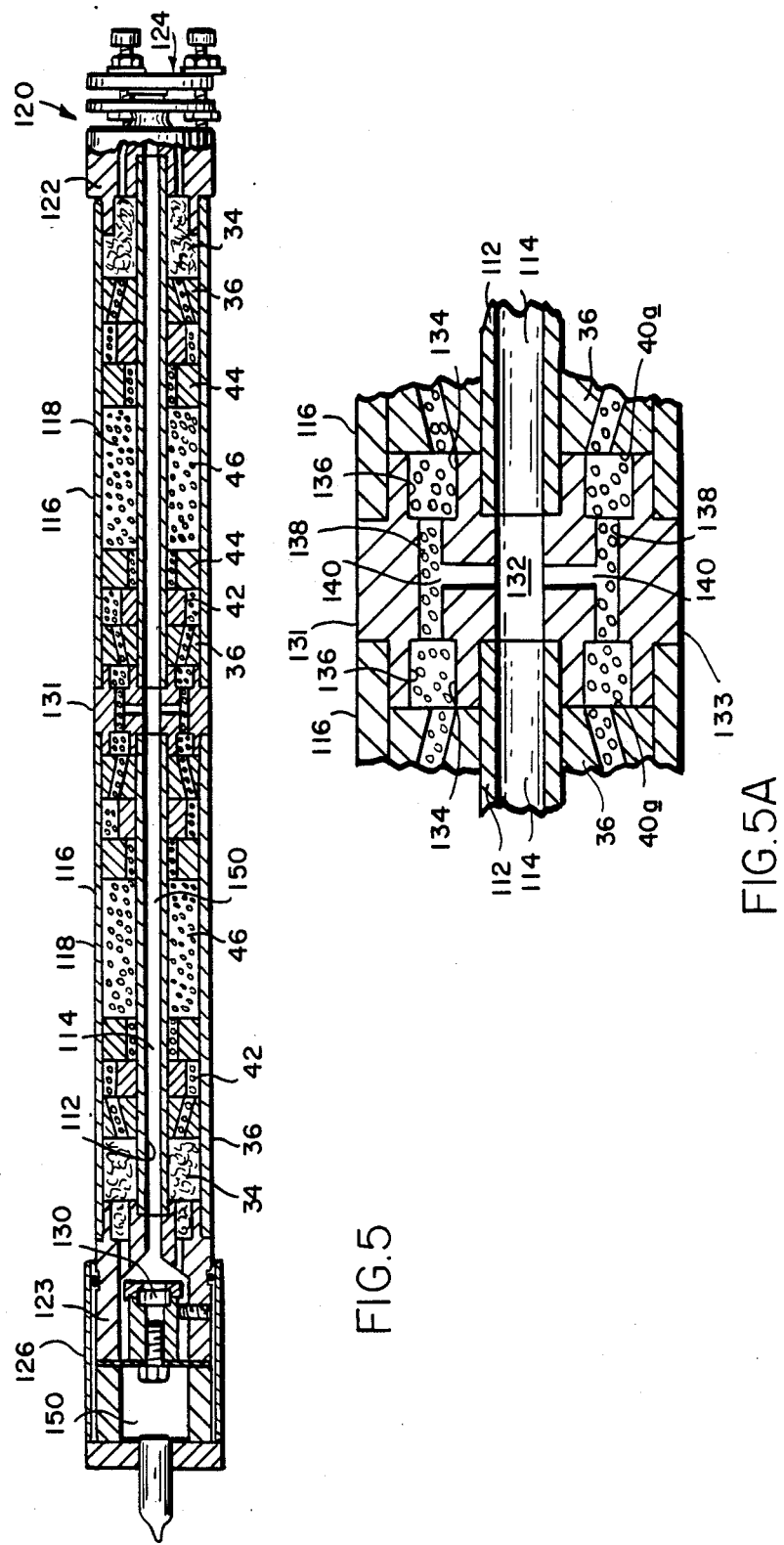

GAS LASER

FIELD OF THE INVENTION

This invention relates to lasers, and in particular to the gas discharge tubes and gas return paths of gas lasers.

BACKGROUND OF THE INVENTION

Recently, there has been an increased interest in, and use of, lasers and the light they generate. Generally, a laser comprises a lasing medium enclosed within an optical resonator defined by a highly-reflecting mirror at one end and a partially-reflecting, partially-transmitting mirror at the opposite end. Energy from an external source is applied to the lasing medium so its atoms or molecules are excited, or pumped, to a higher energy state. After the medium is excited, some of the atoms or molecules return to their original, lower energy state in a short period of time. If the difference in energy levels between the two states is large enough, when the electrons or molecules return to their lower energy state, they each release a quantum of light energy, known as a photon.

In a laser, some of these photons reflect off the mirror and stimulate the excited atoms or molecules causing them to move to a lower energy state and simultaneously emit photons, or lase, with the same characteristics as the reflected photons. Some of the photons pass through the partially-reflecting mirror and travel together as a beam of coherent light. The spatial characteristics of this beam are determined by the lasing medium and by the optical resonator and it carries with it the sum of the energy of the individual photons. Lasers are used wherever it is desirable to have a controllable source of light energy that emits a high energy beam of light that can be precisely focused and that has a small cross-sectional area. Since lasers have been developed, applications have been found for them in science, manufacturing, communications and medicine.

One popular type of laser is a gas laser. In this type of laser a gas lasing medium is contained in an elongated space. Often the space is a discharge bore defined by a discharge tube. The mirrors forming the optical resonator are at each end of the space. Cathode and anode electrodes are in contact with the gas so it can be excited by applying an electrical potential therebetween. Gas lasers are popular because, depending on the gas lasing medium used, they can produce a large variety of light with excellent spatial coherence at high power levels.

However, gas lasers have two design considerations, the solutions to which have been mutually exclusive. The first consideration concerns the flow of positively ionized gas ions towards the electron-emitting cathode. This flow, called cataphoresis, tends to cause the gas to move towards the cathode and causes a region of high pressure to form near the cathode and a region of low pressure to form near the anode. Cataphoresis is a concern because it is often desirable to operate a laser in a continuous wave mode where it generates a beam of light for an extended period of time. When a laser is operated in this mode its gas should be at a uniform equilibrium pressure throughout its bore.

Cataphoresis thus makes it necessary to provide lasers with a gas ballast system to prevent uneven pressure build-ups from occurring in the discharge bore. Some ballast systems include an external gas supply and a vacuum pump. These peripherals work in concert to keep the gas within the bore at a uniform equilibrium pressure. However, these peripherals have a disadvantage because providing them adds to both the bulk and cost of the laser system.

An alternative gas ballast system includes a gas return path between the ends of the discharge bore. The system also includes a volume of ballast gas that is in communication with the return path. This technique allows the gas to recirculate around the discharge tube so a uniform pressure is maintained within the bore. Nevertheless, there is a major disadvantage associated with providing a laser with a gas return path. Electrical current tends to flow through the gas return path and excite the gas therein. This is a needless dissipation of energy that could otherwise be used to excite the lasing gas in the discharge bore so a more intense beam of coherent light can be emitted.

These problems have been solved by providing gas lasers with circuitous gas return paths. This significantly decreases the mean free path length (free electron scan travel) so as to inhibit the flow of electrical current within the gas. Providing a laser with this type of path significantly increases the overall size of the laser system. Furthermore, some gas return paths consist of a series of parallel bores drilled in the gas discharge tube. Providing a tube with a number of bores significantly increases the cost of its manufacture. Other systems include gas return paths formed from ceramic or glass tubes that are external to the discharge tube. These tubes add considerable bulk to the size of the laser system. Moreover, these systems are fragile since the extra tubes are prone to breakage. Also, providing these tubes significantly increases the cost of the laser system.

The second design consideration concerns the means used to dissipate heat away from the discharge bore. The processes of exciting the lasing gas generates a significant amount of heat within the bore. In order to insure that the laser can operate continually over a long period of time, this heat must be dissipated away from the discharge bore before it starts to effect the operating characteristics of the laser.

To date, it has been difficult to provide a laser with an efficient, compact gas return path, and an efficient heat dissipation mechanism. For example, a laser with a multi-bore tube containing a discharge bore and gas return paths may have an efficient gas ballast system. However, the thick wall tube needed to contain the bores, and the free space defined by the gas return paths, would inhibit the conduction of heat away from the discharge bore. Alternatively, a large diameter water jacket can be placed around a thin-walled discharge tube with external gas return paths. Providing a laser with such a jacket significantly adds to both the overall size of the laser system, its fragility, and the cost of manufacturing it.

These two design considerations are especially important in the construction of waveguide lasers. A waveguide laser is a gas laser wherein the diameter of the discharge bore is related to the wavelength of light to be emitted. This enables the stimulated photons to reflect off the bore wall and thus maintain a well confined laser beam. As a result, the internal power losses of the lasing gas is minimized and power of the emitted laser beam is maximized. The diameter of the discharge bore in a waveguide laser is generally very small in comparison to that of a conventional gas laser. Cataphoresis and heat build-up affect waveguide lasers more severely then conventional gas lasers because they occur in a much smaller space. Thus, the design of gas ballast and heat dissipation systems takes on new importance with the increasing attention and use given waveguide lasers.

Another consideration in the manufacture of gas lasers is the construction of their discharge tubes. Currently, bulk ceramics, with drilled bores that are extremely smooth straight and regular, are used as discharge tubes. Tubes with bores precisely formed are used because it is felt by those who are experts in the field that emitted photons will not properly guide, or pass through, bores having other characteristics. The disadvantage of using these tubes is that they are relatively expensive to fabricate, especially if long tubes are required, and thus are a major factor in the total cost of assembling lasers.

A need therefore exists for a gas laser that has an efficient gas ballast system and an efficient means for dissipating the heat generated by the gas laser. A need also exists for a gas laser with a more economical gas discharge tube.

SUMMARY OF THE INVENTION

This invention comprises a laser with a thin walled gas discharge tube having a discharge bore extending axially therethrough. The gas discharge tube is enclosed co-axially within an outer tube so as to define an annular space therebetween. The discharge tube is formed out of an extruded ceramic material. Metal wool is disposed inside the annular space adjacent to both ends of the tubes. Next to the metal wool, within each end of the annular space, there is a ceramic baffle with a number of gas transport bores that extend therethrough. A number of ceramic washers are located inside the annular space adjacent to the baffles. A small washer, closest to the baffles, has an inside diameter equal to the outside diameter of the gas discharge tube and an outside diameter less than that of the inside of the outer tube. A large washer, adjacent to the small washer, has an inside diameter greater than that of the outside of the discharge tube, and an outside diameter equal to that of the inside diameter of the outer tube.

An electrically insulating, thermally conducting, porous fill is disposed in the annular space between the opposite baffle-washer sets. The fill, which may be backed granular material, is also disposed within the baffle gas transport bores, the spaces between the small washers and the outer tube, and the spaces between the discharge tube and the large washers. Suitable granular fill includes sapphire, or aluminum oxide or beryllium oxide ceramics.

Caps are disposed over each end of the outer tube so as to secure the discharge tube within it. One cap serves as a cathode and supports a highly-reflecting mirror, the opposite cap contains an anode and a partially-reflecting mirror. Both caps have gas transport passages connecting the discharge bore and the annular space. An auxiliary gas ballast space may be provided behind the ca holding the highly reflecting mirror.

When this laser is in operation the annular space between the discharge tube and the outer tube serves as a gas return path to maintain a uniform, equilibrium pressure in the discharge bore. The baffles, the washers, and the porous fill all have excellent electrical, insulating characteristics. Furthermore, the metal wool, the baffles, the washers, and the porous fill all distort the flow of the gas so that it must travel a circuitous path through the annular space. The combined effects of these components is to inhibit the flow of electrical current through the gas return path. Thus, almost all of the current supplied to this laser will flow through the gas discharge bore where it will efficiently excite the gas therein.

The components within the annular space fulfill a second purpose; they serve as a path to transfer heat away from the gas discharge bore. Each of the components is constructed of material that readily conducts heat. Thus, the heat generated in the discharge bore readily passes through them and the outer tube and any heat sink to which the laser is thereto.

This laser also eliminates the need to provide a thick-walled discharge tube with multiple bores that serve as the gas return path. This makes it possible to provide a discharge tube with a solid wall as thin as possible. Since the tube is both thin walled and without any additional bores, heat generated within the discharge bore more readily diffuses through it. Also, since the tube only has to be provided with one bore, the cost of fabricating it is reduced.

Another advantage of this laser relates to its discharge tube. An extruded ceramic discharge tube, with the discharge bore formed during the extrusion process, is much less costly to fabricate than a conventional bulk discharge tube that is bored or precision cast. Thus, the overall cost of producing this laser is substantially reduced.

There are other advantages to this laser. Since the need to provide a external gas path is eliminated, both the weight and size of the laser are reduced. A laser constructed according to this invention will have a symmetric, cylindrical profile. This makes it a simple task to mount the laser in a standard optical holder. Furthermore, this laser is a rugged device since its major structural members are high-strength ceramics and it does not have external tubing and does not need to be provided with an external ballast system.

Other advantages of this laser will become obvious as its preferred embodiment is described.

BRIEF DESCRIPTION OF THE DRAWINGS

FIG. 1 is a cross-section view of a single-ended discharge laser according to this invention.

FIGS. 2a–c are face and cross-section views of the baffles of this invention.

FIG. 3 is a face view of the end plate of this invention supporting the partially-reflecting mirror as taken along line 3—3 of FIG. 2.

FIG. 4 is a face view of a support spider according to this invention.

FIG. 5 is a cross-section view of a double-ended discharge laser according to this invention.

FIG. 6 is an enlarged cross section view of the cathode of the double-ended discharge laser of FIG. 5.

DETAILED DESCRIPTION OF THE PREFERRED EMBODIMENTS

As is illustrated in FIG. 1, a single-ended discharge waveguide laser 10 includes a ceramic gas discharge tube 12 with a gas discharge bore 14 extending axially therethrough. The discharge tube is enclosed within a ceramic outer tube 16 such that the tubes are coaxial and there is an annular space 18 therebetween. A first end cap 20 over one end of the tubes 12 and 16 functions as an anode 22 and supports a partially-reflecting mirror 24. A second end cap 26, over the opposite ends of the tubes, functions as a cathode 28 and supports a highly-reflecting mirror 30. The mirrors 24 and 30 are aligned to be parallel with each other across opposite ends of the discharge bore 14 so as to form an optical resonator. A lasing gas 32, such as $CO_2$, with any necessary transfer gases mixed therein, is disposed within the bore 14, the annular space 18, and any other free space within the laser 10.

The discharge tube 12 and the outer tube 16 of this laser 10 are each made out of a ceramic or glass ceramic. The tubes may be formed from extruded ceramics.

Both ends of the annular space 18, adjacent to the caps 20 and 26, are filled with metal wool 34, which forms an inexpensive porous material with good thermal conductivity characteristics. Next to the metal wool, within both ends of the annular space, is a baffle 36 that abuts the outer wall of the discharge tube 12 and the inner wall of the outer tube 16. As is illustrated by FIGS. 2a-c, each baffle 36 includes a number of gas transport bores 38. The axes of the bores are offset from the axis of the laser 10 by approximately 15°-20° so that there is a face 40a with the bores 38 close to the inner perimeter of the baffle and a face 40b with the bores close to the outer perimeter of the baffle. Both baffles 36 are arranged so that the face 40a is against the metal wool 34.

Adjacent to each of the baffles 36 is first a small washer 42, and next a large washer 44. The baffles and the washers are each composed of ceramic or other electrically insulating, thermally conducting material. Suitable material for the baffles and washers include aluminum oxide and beryllium oxide ceramics.

The small washers 42 have an inner perimeter that enables them to fit securely over the gas discharge tube 12 and an outer perimeter spaced away from the inner wall of the outer tube 36. The outer perimeter of the small washers are also spaced to provide free access to the exposed gas transport bores 38 on the face 40b of the adjacent baffle 36. The large washers 44 have an outside perimeter that abuts the inside wall of the outer tube 16 and an inside perimeter spaced away from the gas discharge tube. The washers are also dimensioned so that the outer perimeter of the small washers slightly overlaps the inner perimeter of the adjacent large washer.

The annular space 18 between the large washers 44 is filled with sapphire granules 46, (aluminium oxide,) which is an electrically insulating, thermally conducting material. The granules are sized to fit through a mesh approximately 1 mm. Granules 46 also fill the gas transport bores 38 within the baffles 36, the space between the small washer 42 and the outer tube 16, and the space between the large washer 44 and the discharge tube 12.

The first end cap 20 is provided with an annular lip 48 such that it may be secured into the end of the outer tube 16. The cap is formed from electrically conducting material such that it acts as an anode 22. The cap includes a disk-shaped head 50 that is attached by a flexible neck 52.

The interior of the first cap 20 is provided with a tube nesting bore 54 in which the gas discharge tube 12 is secured. A cap discharge bore 56, coaxial and radial with the discharge bore 14, extends from it to an electron diffusion cavity 58. The diffusion cavity has a diameter greater than that of the discharge bores 14 and 56 and is in communication with a discharge opening 60 in the cap head 50. A plurality of gas transport passages 62 extend between the diffusion cavity and the annular space 18. Each transport passage includes a first bore 64 that extends away from the diffusion cavity 58 at an angle offset to the axis of the laser and a second bore 66 between the first bore and the gas return path that extends from it to the gas discharge path that runs parallel to the axis of the laser.

An end plate 68 is secured to the cap head 50 by screws 70 or other adjustable fasteners. Nuts 72 and threaded bores 73 in the cap 48 are provided for holding the screws. As seen by reference to FIGS. 1 and 3, the partially-reflecting mirror 24 is held to the end plate so it is concentric with the discharge bores 14 and 56. The screws 70 and nuts 72 may be manipulated to adjust the angular position of the mirror 24, relative to the axis of the laser 10. A discharge opening 74 extends between the mirror and the outside of the end plate 68. An O-ring 76 is located between the mirror 24 and the cap head 50 to provide a gas-tight seal therebetween.

The second end cap 26 includes an annular lip 77 that is coupled to the inner wall of the outer tube 16. The cap is formed out of an electron emitting material such that it serves as the cathode 28. There is a tube nesting bore 78 inside the cap in which the adjacent end of the gas discharge tube 12 is secured. A cap discharge bore 80, coaxial and radial with the discharge bore 14, extends from the nesting bore 78. A diffusion cavity 82, with a funnel-shaped profile, is adjacent to the discharge bore 80. A number of gas transport passages 84, parallel with the axis of the laser, extend from the diffusion cavity 82 to the annular space 18. An outer cylinder 85 is sealed over the cap 26 to provide a gas-tight enclosure over the cap assembly.

At the head of the second cap 26 there is a pinch-off tube 86 where the laser is filled with gas during the assembly process. Adjacent to the pinch-off tube, within the cap 28 is an auxiliary ballast space 90 where extra laser gas 32 is held. Gas moves to and from the ballast space through ballast passages 92 that extend between it and the diffusion cavity 82. An outer cylinder 85 over the cap 26 provides a gas-tight enclosure over the entire cap assembly. An O-ring 87 provide a seal between the cylinder 85 and the cap.

The highly-reflecting mirror 30 is secured to a support spider 93 in the cap 26. As seen by reference to FIG. 4, the spider includes a number of spaced apart flexible legs 94 that project inward from an outer ring 96 to a center-piece 98. The mirror 30 is attached to a cylindrical mounting assembly 99 that is attached to the spider by a screw 100. A number of set screws 102 are provided that extend inward from the cap and abut the mounting assembly 100. These screws are provided so the angular position of the mirror 30 relative to the axis of the laser 10 may be adjusted.

When the laser 10 of this invention is in operation a voltage is applied, between the cathode 28 and anode 22 to cause a current flow through the gas discharge bore 14 and excite the gas 32 therein. The gas is able to flow from the discharge bore through the gas transport passages 90 in the second cap 26 adjacent to the cathode 28, through the annular space 18, and through the gas transport passages 62 in the first cap 20, back into the discharge bore. This keeps the gas within the discharge bore 14 at a uniform, equilibrium pressure so the laser will be able to operate in the continuous wave mode.

The angular bend in the gas transport passage 62 of the first end cap 20, the copper wool 34, the angular gas transport bores 38 in the baffles 36, the washers 42, 44 and the granules 46 all distort the flow of the gas 32 so it must travel a circuitous path through the annular space 18. The baffles 36 and large washers 44 prohibit the linear flow of gas adjacent to the outer tube, so all of the gas must travel a circuitous path. The gas 32 must also flow between the small and large washers 42 and 44, which further distorts its path. The granules 46 function as a porous fill, so the flow of the gas is totally distorted around them. The cumulative affect of these components reduce the mean free path length any excited atom or molecule can travel, Furthermore, the baffles 36, the washers 42, 44 and the granules 46 all have good electrical insulating characteristics. The components in the annular space 18 thus inhibit electrical current from flowing within the gas as it travels through the space. All of the current will thus flow through the discharge bore 14 where it will excite the gas therein. As a result, this laser 10 is able to efficiently generate a beam of coherent light. Moreover, its operating characteristics will remain stable over a period of extended, continuous wave operation.

The metal wool 34, the baffles 36, the washers 42 and 44, and the granules 46 also have a second purpose; they serve as a conductive path through which heat generated in the discharge bore 14 can be dispersed. Each of the above components has either good or excellent thermal conductivity characteristics. The metal wool 34, adjacent to the cathode 28 and the anode 22, also serves as thermal paths so heat can be diffused away from them. The granules 46 form a continuous path through which the heat can pass. Since the granules are in the baffle gas transport bores 38, and are adjacent to the free perimeters of the washers 42 and 44, there are no large free spaces within the annular space 18 where the heat will not be conducted across. Thus, the heat generated within the discharge bore 14 will readily be diffused by conduction to the outer tube 16 where it may be readily removed from the system by an appropriate heat sink device.

A related advantage is that this laser 10 does not require a multiple-bore discharge tube with extra bores serving as the gas return path. The discharge tube 12 can be made as thin-walled as possible. Since the tube is both thin-walled and solid, heat from the discharge bore 14 will readily diffuse through it. Furthermore, the cost of fabricating a thin-walled, single-bore tube is substantially less than the cost of producing a tube with multiple circuitous bores.

Also, there is no need to provide this laser with an external gas return path. It has a symmetric, compact, cylindrical cross-section. These features make it a simple task to mount the laser in an optical holder, or in a Vee-block so that it can be provided with kinematic support. These features also contribute to making the laser a highly compact and lightweight unit. The elimination of the external gas return path also reduces the fragility of the laser so it can be used in harsh environments.

The symmetry of the laser also contributes to its stable operation over long periods of time. This is because the heat generated within the discharge bore will be diffused symmetrically over the whole laser, and the return gas will flow evenly through the annular space 18. This prevents the build-up of hot spots and pressure blocks within the laser that could effect its operation. Therefore, this laser is especially suited to continuous wave operation for extended periods of time.

The design of the diffusion cavity 82 in the second cap 26 adjacent to the highly-reflecting mirror 30 adds to the lifetime of this laser 10. The funnel-shaped profile of the cavity causes the positively charged ions to diffuse off the entire surface of the mirror 30, rather than off just a localized spot. Thus, localized wear, and subsequent loss of reflective qualities, caused by the ions repetitively striking one small section of the mirror is substantially eliminated. This increases the lifetime of the laser 10 because if a section of the mirror 30 fails to reflect well, the laser will not efficiently lase or emit coherent light.

Another design feature that contributes to the overall ruggedness of the laser 10 is the arrangement of components within the annular space 18. The baffles 36, the washers 42, 44, and the granules 46 are not firmly attached to each other. Also, a large portion of the annular spaces is packed only with granules. Thus, if the outer tube 16 is stressed, its flexibility will not be impaired by the components within the annular space. This makes it possible for the laser to better withstand some localized stress without breaking or affecting its laser action.

Another advantage of this laser 10 concerns the construction of the discharge tube 12 out of extruded ceramic. These tubes cost considerably less to fabricate than the drilled precision tubes. Thus, using an extruded tube for the discharge tube 12 reduces overall cost of assembly for this laser 10.

Alternative embodiments of this invention are possible. FIG. 5 illustrates a double-ended discharge laser 110 including two discharge tubes 112, each with a discharge bore 114, coupled to a cathode 131. Two outer tubes 116, one over each discharge tube, are also coupled to the cathode. The outer tubes are spaced away from the discharge tubes so as to form an annular space 118 on each side of the cathode. A first end cap 120 coupled to the free ends of one pair of tubes 112 and 116 includes a first anode 122 and a partially-reflecting mirror 124. A second end cap 126 over the free ends of the other pair of tubes 112 and 116 includes a second anode 123 and a highly-reflecting mirror 130. The construction of the end caps 120, and 126 are similar to that of the end caps 20 and 26, respectively, of the single-ended laser 10.

The cathode 131, best seen by reference to FIG. 6, is an annular electron-emitting member with a discharge bore 132 concentric and radial with the discharge bores 114. The cathode also has an outer wall 133 flush with the outer walls of the outer tubes 16. There is a first annular lip 134 on each face of the cathode adjacent to the outer walls of the discharge tubes 112 and a second annular lip 136 adjacent to the inner wall of the outer tube 116. The lips 134 and 136 are provided so the cathode 131 can be coupled to the tubes 112 and 116. A number of gas transport passages 1 38 extend axially through the cathode 130 between the annular spaces 118. A center passage 140 extends perpendicularly from the cathode discharge bore 132 to each of the gas transport passages 138.

Metal wool 34, baffles 36, and washers 42 and 44, are arranged in the annular spaces 118 adjacent to the caps 120 and 126, in a manner identical to their arrangement in the single-ended laser 10. Adjacent to each of the end caps 120 and 126, there is metal wool, then a baffle with its face 40a adjacent to the metal wool, a small washer 42, and then a large washer 44. Against each face of the cathode 131 there a baffle 36 arranged so that the face 40a abuts the cathode and the gas transport bores 38 are between the annular lips 134 and 136. Adjacent to each of the baffles 36 there is first a small washer 42 and then a large washer 44, arranged in the manner similar to their arrangement in the single-ended laser 10.

Granules 46 fill the annular spaces 18 between the large washers 42, adjacent to the washers 42 and 44, and in the gas transport bores 38 of the baffles 36 as in the single-ended laser 10. Granules are also disposed adjacent to the cathode 131 between the annular lips 134 and 136 and in the gas transport passages 144 of the baffles 142.

When the laser 10 is in operation, a voltage is applied between the cathode 130 and the anodes 122 and 123 so that a lasing gas 150 within the discharge bores 114 is ionized. A gas return path is formed by the cathode center passages 140 and gas transport passages 138, and the annular spaces 118 similar to the gas return path of the single-ended laser 10. The components within the annular spaces serve the same purposes as in the single-ended laser; they inhibit the flow of current trough the annular spaces, and they serve as a thermally conductive path to diffuse heat away from the discharge bores 114.

Alternative embodiments of lasers incorporating the features of this invention are possible without departing from the scope of the claims. For example, other gases, such as Helium-Neon, or argon can be used as the lasing medium. Other arrangements of baffles, washers and granules within the annular space are possible. Furthermore, the arrangement of these components within the annular space does not have to be symmetric. The electrodes forming the cathode and anode may be positioned in the laser at any location convenient to its design. Material other than sapphire granules can be used as the porous, electrically insulating, thermally conducting fill. For example, aluminum or beryllium oxide ceramic, granules can be used. Also, the baffles and washers can also be formed of other electrically insulating, thermally conducting material, such as beryllium oxide.

Moreover, the features of this invention may be incorporated in a laser that does not have a discharge tube 12, a discharge bore 14, an outer tube 16, or an annular space 18 with circular, symmetric profiles as described in the preferred embodiment. A laser with a non-circular or asymmetrical discharge tube, discharge bore, outer tube, or annular space may be provided with suitably dimensioned electrically insulating, thermally conducting baffles, washers and porous fill material in its annual space. These components would serve the same function as in the preferred embodiment of this invention; they would inhibit the flow of electrical current in the annular space, and provide a thermally conductive path for dissipating heat generated in the discharge bore. Therefore, it is intended that all matter contained in the above description or shown in the accompanying drawings be interpreted as illustrative and not in a limiting sense.

It is also understood that the following claims are intended to cover all the generic and specific features of the invention herein described.

What is claimed as new and desired to be secured by Letters Patent of the United States is:

1. A gas laser comprising,
   (a) a discharge tube with a discharge bore extending axially therethrough;
   (b) laser gas in said discharge tube bore,
   (c) an outer tube coextensive with and surrounding said discharge tube, and spaced away from said discharge tube so as to define an annular space therebetween from which said laser gas flows into said discharge tube bore;
   (d) a first end cap coupled to one end of said discharge tube and one end of said outer tube, said end cap supporting a partially-reflecting mirror and including at least one gas transport passage between said discharge and said annular space;
   (e) a second cap coupled to the ends of said discharge tube and said outer tube opposite said first cap, said end cap supporting a highly-reflecting mirror and including at least one gas transport passage between said discharge bore and said annular space; and
   (f) at least one electrically insulating, thermally conducting component in said annular space extending between said discharge tube and said outer tube to provide a thermally conductive path between said discharge tube and said outer tube.

2. The laser of claim 1 wherein said component in said annular space comprises an electrically insulating, thermally conductive, porous fill disposed within said annular space between said discharge tube and said annular space.

3. The laser of claim 2 wherein said porous fill is in granular form.

4. The laser of claim 2 wherein said porous fill is aluminum oxide ceramic granules.

5. The laser of claim 2 wherein said porous fill is beryllium oxide ceramic granules.

6. The laser of claim 2 wherein said porous fill is sapphire granules.

7. The laser of claim 1 wherein at least one electrically insulating, thermally conducting baffle is discharged within said annular space between said discharge tube and said outer tube, said baffle including at least one gas transport bore that extends therethrough.

8. The laser of claim 7 wherein said gas transport bores extend axially through said baffles at an angle offset to the axis of said annular space.

9. The laser of claim 7 wherein,
   (a) electrically insulating, thermally conductive, porous fill is disposed in said baffle gas transport bores,
   (b) whereby said laser gas flows through said porous fill in said transport bores.

10. The laser of claim 7 wherein said baffle is formed of aluminum oxide ceramic.

11. The laser of claim 7 wherein said baffle is formed of beryllium oxide ceramic.

12. The laser of claim 1 wherein at least one electrically insulating, thermally conducting, large washer is disposed in said annular space, said washer having an outer perimeter adjacent to said outer tube and an inner perimeter spaced away from said discharge tube.

13. The laser of claim 12 wherein electrically insulating, thermally conducting, porous fill is disposed in said annular space between said large washer and said discharge tube.

14. The laser of claim 12 wherein an electrically insulating, thermally conducting small washer is disposed in said annular space, said small washer having an inner perimeter adjacent to said discharge tube and an outer perimeter spaced away from said outer tube.

15. The laser of claim 14 wherein at least one of small washers is adjacent to one of said large washers.

16. The laser of claim 14 wherein an electrically insulating, thermally conducting porous fill is disposed in said annular space between said large washer and said discharge tube, and between said small washer and said outer tube.

17. The laser of claim 12 wherein said large washers are composed of aluminum oxide ceramic.

18. The laser of claim 12 wherein said large washers are composed of beryllium oxide ceramic.

19. The laser of claim 13 wherein said small washers are composed of aluminum oxide ceramic.

20. The laser of claim 13 wherein said small washers are composed of beryllium oxide ceramic.

21. The laser of claim 1 wherein porous, thermally conducting material is disposed in said annular space in at least one end adjacent to an end cap.

22. The laser of claim 1 wherein said first end cap includes a discharge bore concentrate with and projecting from said discharge bore, a diffusion cavity adjacent to said cap discharge bore, and said gas transport passages extending from said diffusion cavity to said annular space, said transport passages each including at least a portion that extends from said diffusion cavity at an angle offset from the axes of said discharge bores.

23. In a laser including a fluid lasing medium contained in a discharge tube, the improvement comprising,
(a) said discharge tube being formed from a relatively thin wall extruded ceramic tube,
(b) a relatively thick wall outer tube coextensive with and surrounding said discharge tube and defining an annular space therebetween, and
(c) a porous fill material substantially completely filling said annular space,
(d) whereby the orientation of said discharge tube within said outer tube is maintained by said fill material.

24. A gas laser comprising,
(a) a discharge tube with a discharge bore extending axially therethrough;
(b) a laser gas in said discharge tube bore,
(c) an outer tube coextensive with and surrounding said discharge tube, and spaced away from said discharge tube so as to define an annular space therebetween through which said laser gas can flow;
(d) a first end cap coupled to one end of said discharge tube and one end of said outer tube, said end cap including at least one gas transport passage between said discharge bore and said annular space;
(e) a second end cap coupled to the ends of said discharge tube and said outer tube opposite said first cap, said end cap including at least one gas transport passage between said discharge bore and said annular space; and
(f) at least one electrically insulating, thermally conducting component in said annular space extending between said discharge tube and said outer tube to provide a thermally conductive path between said discharge tube and said outer tube.

25. The laser of claim 24 wherein,
(a) said component in said annular space comprises an electrically insulating, thermally conductive, porous fill disposed within said annular space between said discharge tube and said annular space.
(b) whereby said laser gas can flow through said porous fill.

26. The laser of claim 25 wherein said porous fill is in granular form.

27. The laser of claim 25 wherein said porous fill is aluminum oxide ceramic granules.

28. The laser of claim 25 wherein said porous fill is beryllium oxide ceramic granules.

29. The laser of claim 25 wherein said porous fill is sapphire granules.

* * * * *